June 20, 1950

L. E. MOBERLY 2,512,362

PROCESS FOR IMPREGNATING CARBON BRUSHES

Filed Feb. 25, 1946

WITNESSES:
E. G. McCloskey.
Leon J. Laza

INVENTOR
Lawrence E. Moberly.
BY
O. H. Eschholz
ATTORNEY

Patented June 20, 1950

2,512,362

UNITED STATES PATENT OFFICE 2,512,362

PROCESS FOR IMPREGNATING CARBON BRUSHES

Lawrence E. Moberly, Pittsburgh, Pa., assignor to Westinghouse Electric Corporation, East Pittsburgh, Pa., a corporation of Pennsylvania Application February 25, 1946, Serial No. 650,085

3 Claims. (Cl. 117—121)

The invention relates to a method for treating carbon bodies or brushes to impregnate them with metal halides.

Heretofore, the chemical processes practiced for impregnating carbon bodies and carbon brushes with metal halides have resulted in the forming of deleterious materials in the brushes in addition to the impregnants. Such materials are undesirable and must be removed for good brush operation. The processes for removing such additional materials generally either decompose or remove the impregnants or change the characteristics of the brush so that it will not meet the specifications. Consequently, in order to impregnate brushes by chemical methods, it is necessary to employ impregnants that will not produce materials hard to remove or which are objectionable in use.

The object of the invention is to provide for impregnating carbon brushes with metal halides having high melting temperatures and low solubility characteristics.

Other objects of the invention will, in part, be obvious and, in part, will appear hereinafter.

Figure 1:
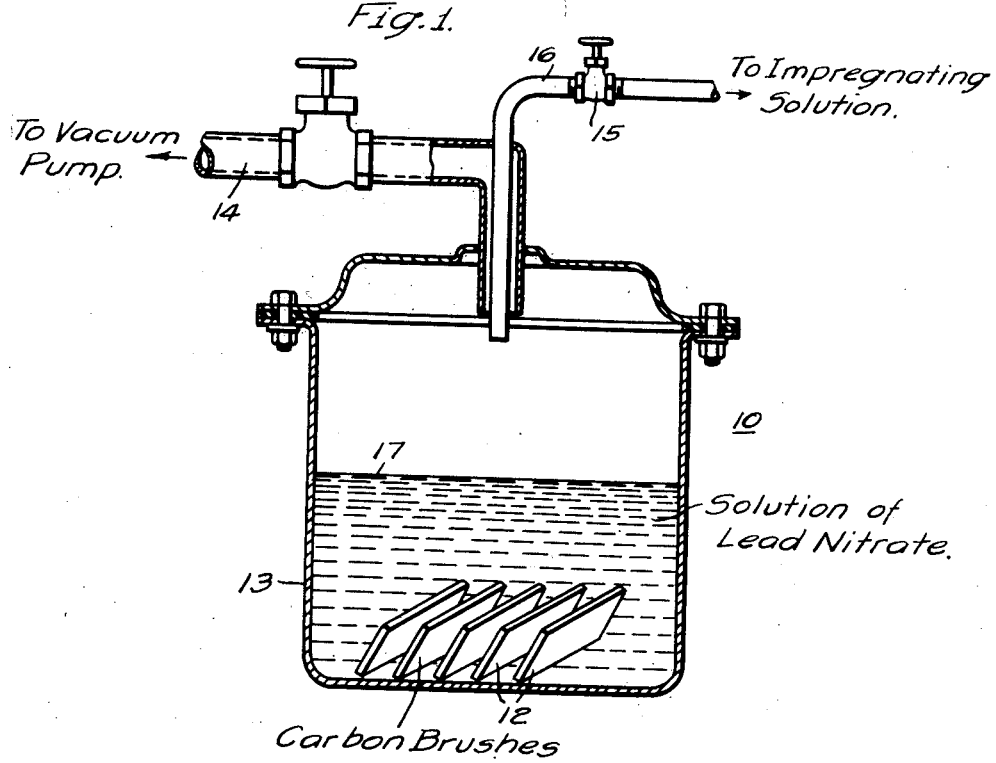
Figure 2:
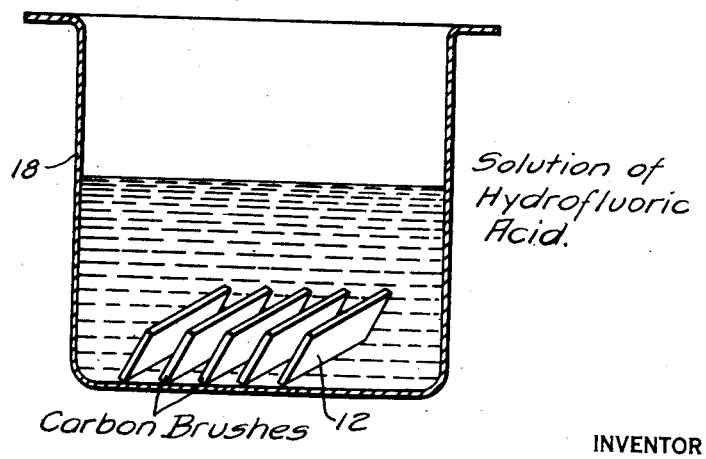

For a general understanding of the nature and objects of the invention, reference should be had to the following detailed description taken in conjunction with the accompanying drawings, in which:

Figure 1 is a diagrammatic view of vacuum apparatus adapted for the vacuum impregnation of carbon bodies or brushes, and Fig. 2 is a diagrammatic view of a container showing how the carbon bodies or brushes may be soaked in a halogen acid to produce the impregnants in the brushes.

It has been found that the impregnation of carbon brushes for use on commutators with a metal halide gives very beneficial results. It has been established that brushes treated with metal halides apply lubricating films to the commutator which greatly increase the life of the brushes. Many explanations have been offered as to why this happens but it is sufficient for the purpose of this application to say that trials have demonstrated the fact.

The use of metal halides in brushes was originally intended for brushes used in high altitudes to prevent dusting. However, it was soon found that metal halides were beneficial for use under many other conditions.

In the present invention, the problem of introducing metal halides which have high melting temperatures and low solubility characteristics has been solved. Brushes which operate at high temperatures and which are unaffected by solvents of one kind or another, such as water, are highly desirable. It has also been found that the materials employed for impregnating the brushes must be non-hygroscopic so that they do not absorb moisture from the atmosphere.

Referring now to the drawing and Fig. 1, in particular, a vacuum tank shown generally at 10 is provided for impregnating the brushes. As illustrated, a number of carbon bodies or brushes 12 are introduced into the container 13. The vacuum pump is then set in operation to evacuate the container 13 through the tube 14. This effects the removal of substantially all the air from the porous brushes 12.

After the container 13 has been evacuated, the valve 15 in the pipe 16 is opened and a quantity of the impregnating solution which in this instance is a solution of lead nitrate is delivered to the container 13. The solution 17 in the tank 13 will be raised to a level high enough to immerse all of the brushes 12. Since the carbon brushes 12 have been subjected to a vacuum, most of the air has been removed and the solution of lead nitrate will rapidly penetrate the brushes and produce a substantially homogeneous impregnation.

After the brushes 12 have been impregnated, they are subjected to a heat treatment either in the vacuum container 13 or they may be removed from the vacuum container and buried in a mass of powdered carbon. The purpose of either heating in a vacuum or buried in powdered carbon is to keep them out of contact with the air. It will be readily understood that the brushes may be protected from the atmosphere in other ways well known in the art.

Means for heating the brushes either in the vacuum container 13 or when buried in powdered carbon are not illustrated since means for applying heat under such conditions are well known in the art. Electrical heating apparatus could readily be employed. It has been found that the heating of the brushes to a temperature of around 500° C. is adequate to effect the decomposition of the lead nitrate solution.

When the lead nitrate solution in the brush is subjected to a temperature of the order of 500° C., it breaks down into lead oxide and oxides of nitrogen, the latter being gaseous escapes from the brushes. The brushes carrying a quantity of lead oxide are then removed from the vacuum tank or the mass of powdered carbon in which they have been buried and introduced into a container such as 18. A sufficient quantity of a solution of hydrofluoric acid is introduced into the container 18 to immerse the brushes.

The concentration of the hydrofluoric acid will depend on the amount of metal halide it is desired to form in the brushes. It has been found that by using concentrated solutions of lead nitrate and hydrofluoric acid that 8% by weight of a metal halide can be deposited or formed in the carbon brush by a single impregnation process. In the manufacture of brushes, it has been found that when they carry 8% metal halide that they have satisfactory wearing characteristics for most purposes.

When the brushes carrying the residue of a heat treated solution of lead nitrate is immersed in the hydrofluoric acid a chemical action results and lead fluoride and water are formed. After the formation of the lead fluoride, the brushes are subjected to a drying treatment at around 100° C. which drives off excess hydrofluoric acid and the water.

If a sufficient amount of lead fluoride has not been deposited with one treatment, it can be repeated until a sufficient amount of lead fluoride is deposited. It is well known that lead fluoride has a high melting temperature, low solubility characteristics and is substantially non-hygroscopic.

It has been found that if instead of using a solution of hydrofluoric acid, hydroiodic acid were substituted, then lead iodide would be produced in the brushes.

In the treatment of carbon brushes, solutions of barium acetate have been employed for impregnating the brushes which when decomposed by heat treatment results in a residue of barium oxide and barium carbonate. The barium residue is then treated with a solution of hydrofluoric acid producing a quantity of barium fluoride. The method of impregnating the brushes and treatment with hydrofluoric acid may be the same as described hereinbefore for lead nitrate. The amount of barium fluoride deposited will depend on the operating conditions to be met. It has been found that about 8% can be deposited with one treatment by using concentrated solutions.

I have also used with success a solution of lead acetate and hydroiodic acid. A treatment of this kind forms in the brush lead iodide which has very desirable characteristics.

Lead nitrate and hydroiodic acid may be employed to form lead iodide in the brush. The beneficial results of lead iodide in the carbon brush are widely known to the trade.

Lead acetate and hydrofluoric acid also may be used to form lead fluoride in a brush. The quantity of lead fluoride desired has been described hereinbefore.

While the use of solutions of halogen acids have been specifically described, halogen acid gases or halogen gases may be employed.

Brushes impregnated with lead fluoride, lead iodide and barium fluoride have all been tested to determine their utility. Brushes carrying any of these materials have proved very successful in resisting dusting at high altitudes. These brushes have withstood wear and dusting.

Since various changes may be made in the hereinbefore described methods and different embodiments of the invention may be made without departing from the scope and spirit thereof, it is intended that all matter contained in the above description or shown in the accompanying drawings shall be interpreted as illustrative and not in a limiting sense.

I claim as my invention:

1. In the process of treating carbon brushes, the steps of impregnating the carbon brush with substantial amounts of a concentrated solution of metal salt selected from the group consisting of lead nitrate and lead acetate, heating the carbon brush and contained solution to a temperature of the order of 500° C. for a period of time sufficient to decompose substantially completely the metal salt and thereby deposit solid lead oxide within the pores of the carbon brush and drive off volatile components, and subjecting the brush and the lead oxide contained therein to a halogen acid selected from the group consisting of hydrofluoric acid and hydroiodic acid for a period of time sufficient to substantially completely change the deposited lead oxide to a halogenated lead compound.

2. In the process of treating carbon brushes to embody therein a metal halide, the steps of impregnating the carbon brush with substantial amounts of a concentrated solution of at least one metal salt from the group consisting of lead nitrate and lead acetate, the solvent of the solution being readily volatile, heating the carbon brush while out of contact with the air to a temperature of the order of 500° C. for a period of time sufficient to decompose substantially completely the metal salt and thereby deposit solid lead oxide within the pores of the carbon brush and drive off the volatile components, and subjecting the brush and the lead oxide contained therein to a halogen acid selected from the group consisting of hydrofluoric acid and hydroiodic acid for a period of time sufficient to substantially completely change the lead oxide carried by the brush to a halogenated lead compound.

3. In the process of treating carbon brushes, the steps of impregnating a carbon brush with a concentrated metallic salt solution in which the metal salt is lead nitrate, heating the impregnated brush and the contained lead nitrate solution out of contact with the air to a temperature of the order of 500° C. for a period of time sufficient to decompose substantially completely the lead nitrate and thereby deposit solid lead oxide within the pores of the carbon brush, and subjecting the carbon brush and the lead oxide carried by it to hydrofluoric acid for a period of time sufficient to substantially completely change the lead oxide carried by the brush to lead fluoride, the solution for impregnating the carbon brush and the acid for soaking the brush being of predetermined concentrations, and the metal halide produced in the brush is about 8% by weight of the brush.

LAWRENCE E. MOBERLY.

REFERENCES CITED

The following references are of record in the file of this patent:

UNITED STATES PATENTS

| Number | Name | Date |
|---|---|---|
| 369,091 | Bernstein | Aug. 30, 1887 |
| 1,620,940 | Bleecker | Mar. 15, 1927 |
| 1,839,168 | Stampe | Dec. 29, 1931 |
| 1,895,756 | Fuller | Jan. 31, 1933 |
| 1,991,487 | Bemis | Feb. 19, 1935 |
| 2,414,514 | Elsey | Jan. 21, 1947 |
| 2,428,036 | Peters et al. | Sept. 30, 1947 |

OTHER REFERENCES

Roscoe and Schlorlemmer: Treatise on Chemistry, MacMillan & Co., Ltd., London, vol II, 1907, pp. 870 and 877.